United States Patent [19]

Takeda et al.

[11] 4,041,009
[45] Aug. 9, 1977

[54] PROCESS FOR PRODUCING ANTI-BLOCKING AND LOW PRESSURE MOLDABLE DIALLYL PHTHALATE RESIN MOLDING MATERIALS

[75] Inventors: Shiroh Takeda, Sagamihara; Yuji Nagai, Komae; Takenori Suzuki, Yokohama, all of Japan

[73] Assignee: Fujitsu Limited, Kawasaki, Japan

[21] Appl. No.: 748,678

[22] Filed: Dec. 8, 1976

[51] Int. Cl.$^2$ ............................................. C08K 7/14
[52] U.S. Cl. ............................ 260/42.18; 260/32.8 R; 264/331; 526/15; 526/57; 526/322
[58] Field of Search ............ 260/42.18, 32.8 R; 526/15

[56] References Cited

U.S. PATENT DOCUMENTS

| | | | |
|---|---|---|---|
| 3,579,484 | 5/1971 | Thomas | 260/42.18 |
| 3,898,192 | 8/1975 | Wright | 260/42.18 |

*Primary Examiner*—James H. Derrington
*Attorney, Agent, or Firm*—Staas & Halsey

[57] ABSTRACT

A diallyl phthalate resin prepolymer is milled at a temperature of 40° to 100° C together with reinforcing glass fiber and at least one finely divided inorganic filler in the presence of t-butylperoxy 2-ethylhexanoate and at least one other organic peroxide having a half life of one hour at a temperature within the range from 120° to 150° C, cooled and comminuted to provide a molding material which is anti-blocking and has a good workability and shelf stability. The material can be molded at relatively low pressures to moldings of an excellent bending strength.

6 Claims, No Drawings

PROCESS FOR PRODUCING ANTI-BLOCKING AND LOW PRESSURE MOLDABLE DIALLYL PHTHALATE RESIN MOLDING MATERIALS

The present invention relates to a process for the production of diallyl phthalate resin molding materials. More particularly, it relates to a process for the production of diallyl phthalate resin molding materials which are moldable at relatively low pressures and have an excellent anit-block property.

Diallyl phthalate resin molding materials capable of being molded at low pressures, for example, 10 to 100 kg/cm$^2$, may be prepared form a prepolymer having a relatively low molecular weight. However, the low pressure moldable material so produced are generally apt to block at ambient temperature and usually have unsatisfactory workability and poor shelf stability. On the other hand, although diallyl phthalate resin molding materials prepared from a prepolymer having a relatively high molecular weight are anti-blocking and have acceptable workability and shelf stability, they generally require high molding pressures.

A principal object of the invention is to provide a process for the production of anti-blocking and low pressure moldable diallyl phthalate resin molding materials.

It has now been found that diallyl phthalate resin molding materials which are anti-blocking and have a good workability and shelf stability and which can be molded at relatively low pressures, for example 10 to 100 kg/cm$^2$ to moldings having an excellent bending strength, may be prepared by a process wherein a composite catalyst system is used, said system essentially consisting of at least one organic peroxide which remains substantially intact during the manufacturing process and will be activated during the molding process and of t-butylperoxy 2-ethylhexanoate which is activated during the manufacturing process.

In accordance with the invention there is provided a process for the production of anti-blocking and low pressure moldable diallyl phthalate resin molding materials, wherein a mixture of 100 parts by weight of at least one diallyl phthalate resin prepolymer, 50 to 150 parts by weight of glass fiber, 30 to 200 parts by weight of at least one finely divided inorganic filler, 0.1 to 1.0 part by weight of t-butylperoxy 2-ethylhexanoate and 1.5 to 4.0 parts by weight of at least one organic peroxide having a half life of one hour at a temperature within the range of from 120° to 150° C, is milled at a temperature of 40° to 100° C. The milled mixture is cooled and then comminuted to provide a molding material.

t-Butylperoxy 2-ethylhexanoate should be used in an amount of 0.1 to 1.0 part by weight, based on 100 parts by weight of the diallyl phthalate resin prepolymer used. If no t-butylperoxy 2-ethylhexanoate is used or the amount of t-butylperoxy 2-ethylhexanoate is substantially less than 0.1 part by weight per 100 parts by weight of the prepolymer, the resultant molding material tends to block and the moldings obtained therefrom have a poor bending strength. On the other hand when t-butylperoxy 2-ethylhexanoate is used in an amount of substantially exceeding 1.0 part by weight per 100 parts by weight of the prepolymer, in a case wherein the milling has been carried out at relatively high temperatures, for example, from 80° 1 to 100° C, for a sufficient period of time to exhaust the t-butylperoxy 2-ethylhexanoate, the molding material so obtained will have no more an acceptable low pressure moldability and whereas in a case wherein the milling has been carried out a relatively low temperatures, for example, from 40° to 50° C, the molding materials so obtained will contain a proportion of undecomposed t-butylperoxy 2-ethylhexanoate and have a poor shelf stability.

Organic peroxides usable in combination with the t-butylperoxy 2-ethylhexanoate in the process of the invention must not appreciably be activated during the process of manufacturing the molding materials, and should have a half life of at least one hour at a temperature of 120° C. Further, they should not have a half life of longer than 1 hour at a temperature of 150° C, or otherwise a satisfactory catalytic activity cannot be afforded during the molding process (which is usually carried at 150° to 180° C). By the term "a half-life of an organic peroxide at a certain temperature" is meant a half life of the peroxide in a diluted solution in benzene maintained at the temperature indicated. The half life of a given peroxide is known from the peroxide manufacturers or may readily be determined by procedures described in *Modern Plastics*, 1959, Febuary, page 144. While there are known numbers of organic peroxides meeting the requirements herein prescribed, we prefer among others to use at least one organic peroxide selected from the group consisting of t-butylperoxy laurate, t-butylperoxy benzoate, dicumyl peroxide and cyclohexanone peroxide in an amount of 1.5 to 4.0 parts by weight based on 100 parts by weight of the prepolymer, because we have found that these preferred peroxides result in the final moldings of excellent strength.

The term "a diallyl phthalate resin prepolymer" includes prepolymers having a number average molecular weight of more than about 1,000, derived from diallyl phthalate, diallyl isophthalate and diallyl terephthalate. These prepolymers may be used alone or in combination. If desired, a minor amount (up to 30% by weight, based on the total weight of the resins) of other resins compatible with the diallyl phthalate resin prepolymer, may be added. The diallyl phthalate resin prepolymer or a mixture thereof used in the process of the invention should preferably have a flowing point of 80° C or lower.

A wide variety of finely divided inorganic fillers may be used in the process of the invention, including, for example, finely divided calcium carbonate, silica, diatomaceous earth, clay, mica and the like. By properly selecting the nature, particle size and proportion of the inorganic fillers used, beneficial results can be achieved. Low pressure moldable diallyl phthalate resin molding materials generally have a relatively low melt viscosity and suffer from such a disadvantage that when they are melt-molded they are likely to form "flashes." This is a phenomenon that a molten molding material flows into clearances in the joint of molds and is solidified there. The so formed flashes are also referred to as "burrs," "fins," "lands," "land flashes" or "mold flashes." It has now been found that such a disadvantage of flash formation, normally associated with low pressure moldable diallyl phthalate resin molding materials, may be obviated by using as the finely divided inorganic filler (i) 6 to 30% by weight, based on the total weight of the molding material, of finely divided particles of an inorganic material selected from the group consisting of calcium carbonate, silica, diatomaceous earth, kaolin and talc, said particles having an average particle size in the range 1 to 50 μm, provided that at least 30% by weight of the particles have an actual particle size in the range 20 to 100 μm, in combination with (ii) 8 to 30%, preferably 8 to 20% by weight, based on the total weight of the molding material, of finely divided particles of an inorganic material capable of imparting a dilatant property to the prepolymer when molten, said last-mentioned particles having an average particle size of less than 1 μm. Commercially available modified clay supplied by Burgess Pigment Co., under the trade names of "Burgess KE" and "Burgess ICE-BERG" may conveniently be used as the above-mentioned dilatancy imparting inorganic material. Other additives normally employed in the production of molding materials, such as flame retardants, lubricants, antioxidants, pigments, and the like, may also be incorporated in amounts normally employed.

We have also found that diallyl phthalate resin molding materials having a remarkably improved bending strength can be prepared by using 10 to 50%, preferably 20 to 45% by weight, based on the total weight the molding material, of finely divided particles of calcium carbonate, said particles having an actual particle size of not greater than 0.08 μm, in the process of the invention as a whole or part of the finely divided inorganic filler.

The mixture to be milled in accordance with the process of the invention at a temperature of 40° to 100° C, may be prepared by blending the components in various manners. One of such methods is a wet method, wherein the diallyl phthalate resin prepolymer component is dissolved in a solvent, such as acetone, and the resultant solution is intimately mixed with other components in a suitable device, such as a mixer, ball mill or kneader, and then heated to remove the solvent. Alternatively, the mixture may be prepared by a dry method, wherein all of the components of the mixture are blended together in a mixer, ball mill or kneader. In a preferred dry method, the prepolymer and glass fiber components may be blended in a kneader at a temperature which is at least 20° C above the flowing point of the prepolymer but below 120° C, said prepolymer component having a flowing point of not higher than 80° C, and the resultant blend is, preferably after cooled and comminuted to pieces, blended with the remaining components.

The mixture so prepared is then milled at a temperature of 40° to 100° C to activate the t-butylperoxy 2-ethylhexanoate for a sufficient period of time to substantially exhaust this catalyst. While the milling time required depends on the particular milling temperature, the amount of the t-butylperoxy 2-ethylhexanoate and the milling ability of the mill used, it may be 10 minutes or less when the milling is carried out relatively high temperatures, for example, about 70° to 100° C. With lower milling temperatures a longer time is required to complete the milling operation. The milled mixture is then cooled and comminuted to provide a molding material.

The invention will be further described by the following examples, in which all parts are by weight unless otherwise specified.

For measuring the bending strength, the molding material to be tested was molded into a specimen having a thickness of 4 mm, a breadth of 10 mm and a length of 100 mm at a temperature of 160° C (unless otherwise specified) and a pressure of 70 kg/cm$^2$ for a period of 4 minutes. After conditioning the specimen so molded at a relative humidity of 65% for 24 hours, the bending strength was measured in accordance with JIS K 6918 with a span of 64 mm and a rate of loading of 2 mm/min. The reported value was an average of 4 measurements.

The spiral flow of the molding material was measured at a temperature of 150° C and a pressure of 70 kg/cm$^2$, using a specially designed EMMI (Epoxy Molding Materials Institute of the Society of the Plastic Industry Inc.) mold.

EXAMPLE 1

Materials indicated in Table I below were blended and each portion of the resulting mixture was milled on a two roll mill for 10 minutes at temperature of 42°, 60° or 80° C.

Table I

|  | Parts |
|---|---|
| Prepolymer of diallyl isophthalate[1] | 30 |
| Prepolymer of diallyl phthalate[2] | 10 |
| Dicumyl peroxide[3] | 1.0 |
| t-Butylperoxy 2-ethylhexanoate | 0.10 |
| Glass fiber[4] | 45 |
| Calcium carbonate[5] | 12 |
| Calcium stearate | 1 |
| Carbon black[6] | 1 |

[1]"DAP100L", supplied by Osaka Soda Co., Ltd., having a number average molecular weight of about 2,000 to 4,000 and a flow point of about 30° C.
[2]"DAP.A", supplied by Osaka Soda Co., Ltd., having a number average molecular weight of about 9,000 to 11,000 and a flow point of about 100° C. The mixture of the prepolymers had a flow point of about 65° C.
[3]Dicumyl peroxide has a half life of 1 hour at 143° C.
[4]"CS6E401", supplied by Nitto Boseki Co., Ltd., and chopped to 6 mm in length.
[5]"Whiton SB Red", supplied by Shira-ishi Calcium Kaisha Ltd., having an average particle size of 1.7 μm.
[6]"Seast SO", supplied by Tokai Electric Manufacturing Co., Ltd., having an average diameter of 0.04 μ.

After being allowed to cool the milled mixture was comminuted to provide a molding material.

For a comparative purpose the procedure was repeated except that the 10 minutes milling was carried at a temperature of 22° C (Control 1).

For a further comparative purpose the above-mentioned procedure was repeated with the exception that the t-butylperoxy 2-ethylhexanoate was omitted and the milling was carried out at a temperature of 60° C (Control 2).

The properties of the products are shown in Table II below.

Table II

| | Properties of molding materials | | | | |
|---|---|---|---|---|---|
| Sample of | control 1 | | Example 1 | | Control 2 |
| Milling temperature (° C) | 22 | 42 | 60 | 80 | 60 |
| Spiral flow (cm) | 71 | 62 | 58 | 50 | 150 |
| Anti-block property | fair | good | excellent | excellent | poor |
| Bending strength (kg/cm$^2$) | 10.2 | 12.5 | 14.0 | 14.2 | 12.0 |
| Press time required for a constant bending strength at 160° C (sec.) | 180 | 240 | 210 | 210 | 300 |

As seen from Table II, the molding material of Control 2 wherein t-butylperoxy 2-ethylhexanoate was not added has a poor anti-block property and the worsest processability. The anti-block property of the molding material of Control 1 wherein t-butylperoxy 2-ethylhexanoate was added but the mixture was milled at a low temperature, is fair but still practically unacceptable. Beneficial effects of the addition of t-butylperoxy 2-ethylhexanoate are noted in the reduction in the spiral flow, the excellent anti-block property, the improved bending strength and the fast curing property as reflected by the shorter press time required for reaching a constant bending strength. The molding material of Control 2 was further heat treated at 100° C for 60 minutes. But only a slight improvement was observed in the anti-block property. Upon heat treatment of the molding material of Control 2 at 125° C for 30 minutes, the material was completely gelated. The fact that the materials obtained in Example 1 with the milling temperatures of 60° C and 80° C have similar properties reveals that the process of the invention is a stable process.

a two roll mill for 20 minutes at a temperature of 80° C, cooled and comminuted to provide a molding material.

Each molding material so prepared was tested for the formation of flashes using a specially designed mold. The mold used was comprised of upper and lower female halves having therebetween a central sprue and an annular cavity connected by four radial gate runners. The annular cavity had outer and inner diameters of 60 mm and 30 mm, respectively, and was provided with eight radially, outwardly extending slits, having a length of 50 mm, a breadth of 3 mm and different depths varying from 10 μm to 80 μm at 10 μm intervals. The lengths of the resin which had invaded the slits and been solidified therein were taken as measures indicating the tendency of forming flashes. The tests were carried out under the molding conditions of 120 kg/cm$^2$ and 160° C. The results are shown in Table III below.

Table III

| Run No. | 1 | 2 | 3 | 4 | 5 | 6 | 7 | 8 | 9 | 10 | 11 |
|---|---|---|---|---|---|---|---|---|---|---|---|
| Mixture of finely divided materials (parts) | | | | | | | | | | | |
| Burgess KE [1] | 0 | 27 | 0 | 0 | 12 | 12 | 12 | 12 | 12 | 12 | 9 |
| Whiton 450 [2] | 0 | 0 | 27 | 0 | 6 | 8 | 10 | 12 | 15 | 0 | 12 |
| Crystallite B-1 [3] | 0 | 0 | 0 | 27 | 0 | 0 | 0 | 0 | 0 | 10 | 0 |
| Whiton SB Red | 27 | 0 | 0 | 0 | 9 | 7 | 5 | 3 | 0 | 5 | 6 |
| Length of artificial flash in mm formed in the slit of the deepness of | | | | | | | | | | | |
| 10 μm | 5 | 1 | 2 | 2 | 2 | 1 | 2 | 2 | 2 | 0 | 2 |
| 20 μm | 4 | 1 | 1 | 2 | 1 | 1 | 1 | 2 | 1 | 0 | 1 |
| 30 μm | 10 | 8 | 3 | 2 | 2 | 3 | 2 | 1 | 1 | 0 | 1 |
| 40 μm | 35 | 42 | 4 | 3 | 3 | 2 | 1 | 3 | 2 | 3 | 2 |
| 50 μm | 50 | 34 | 7 | 3 | 3 | 4 | 3 | 4 | 3 | 2 | 4 |
| 60 μm | 50 | 50 | 18 | 5 | 4 | 3 | 4 | 3 | 2 | 2 | 4 |
| 70 μm | 50 | 50 | 13 | 14 | 18 | 12 | 6 | 4 | 0 | 3 | 2 |
| 80 μm | 50 | 50 | 22 | 18 | 20 | 20 | 14 | 4 | 4 | 3 | 2 |
| Rating [4] | 1 | 1 | 2 | 2 | 3 | 3 | 4 | 5 | 5 | 5 | 5 |

| Particle size | % of number of particles | % by weight |
|---|---|---|
| <5 μm | 42 | 0.4 |
| 5 – 10 μm | 36 | 8.5 |
| 10 – 20 μm | 17 | 32.1 |
| 20 – 30 μm | 4 | 35.0 |
| 30 – 40 μm | 1 | 24.0 |

Number average particle size = 7.65 μm
[1] Surface-treated calcined clay supplied by Burgess Pigment Co., having an average particle size of about 0.05 μm.
[2] Calcium carbonate supplied by Shira-ishi Calcium Kaisha Ltd., having the following particle size distribution.
[3] Selia supplied by Shira-ishi Calcium Kaisha Ltd., have a substantially uniform particle size of about 30 μm.
[4] 5-stage rating, in which the numeral 5 indicates the best while the numeral 1 the worst.

EXAMPLE 2

Twenty parts of a prepolymer of diallyl isophthalate, "DAP100L," 20 parts of a prepolymer of diallyl phthalate, "DAPK" (supplied by Osaka Soda Co., Ltd., having a number average molecular weight of about 9,000 and a flow point of about 90° C), 1.0 part of dicumyl peroxide, 0.1 part of t-butylperoxy 2-ethylhexanoate, 30 parts of chopped strands glass fiber, "CS6E401" (6 mm in length), 1.0 part of calcium stearate and 1.0 part of carbon black "Seast SO," were mixed together with each of the mixtures of finely divided materials as indicated in Table III. The resulting mixture was milled on

EXAMPLE 3

Twenty parts of a prepolymer of diallyl isophthalate, "DAP100L," 15 parts of a prepolymer of diallyl phthalate, "DAPK," 1.0 part of dicumyl peroxide, 0.1 part of t-butylperoxy 2-ethylhexanoate, 28 parts of chopped strands of glass fiber (6 mm in length), "CS6E401," 1.0 part of calcium stearate, 1.0 part of Carbon black, "Seast SO," and 34 parts of each finely divided calcium carbonate indicated in Table IV below were milled on two roll mill for 20 minutes at a temperature of 80° C. After cooling the rolled mixture was comminuted to provide a molding material.

The molding materials so prepared were tested for the bending strength. The results are also shown in Table IV below.

Table IV

| Run No. | 1 | 2 | 3 | 4 | 5 |
|---|---|---|---|---|---|
| CaCO$_3$ used | "Whiton R06" | "Whiton CCR" | "Whiton 103" | "Whiton SB Red" | "Whiton 450" |
| Average size (in μm) | 0.04 | 0.08 | 0.12 | 1.7 | 7.65 |
| Size distribution in μm (% by weight) | 0.04–0.06(10) 0.03–0.04(75) <0.03(15) | 0.08–0.12(10) 0.07–0.08(76) <0.07(14) | 0.12–0.30(10) 0.10–0.12(75) 0.08–0.10(5) <0.08(10) | >1.7(15) 1.5–1.7(75) <1.5(10) | — |
| Bending | | | | | |

Table IV-continued

| Run No. | 1 | 2 | 3 | 4 | 5 |
| --- | --- | --- | --- | --- | --- |
| strength in kg/cm$^2$ | 16.0 | 15.2 | 12.0 | 12.0 | 11.0 |

EXAMPLE 4

A prepolymer of diallyl isophthalate, "DAP100L", (1820g) was melted in a pressure kneader at a temperature of 82° C and a pressure of 8 kg/cm$^2$. A prepolymer of diallyl phthalate, "DAPK," (980) was portionwise added to the molten resin under stirring. After completion of the addition, the resin mixture was kneaded for 2 hours. The resin mixture had a flow point of about 50° C. Chopped strands of glass fiber, "CS6E401," (2100g), was added to the resin mixture, and the kneading was continued for further 1 hour. The kneaded mixture was removed from the kneader and, while being in a softened state, passed through a two roll mill to provide a sheet, allowed to cool and then comminuted to pieces.

Separately, a mixture of the following ingredients was prepared.

| | |
| --- | --- |
| Dicumyl peroxide | 10 g |
| t-butylperoxy 2-ethylhexanoate | 1.0 g |
| Carbon black "Seast SO" | 10 g |
| Sb$_2$O$_3$ (reagent grade) | 20 g |
| Diallyl chlorendate | 40 g |
| CaCO$_3$ "Whiton SB Red" | 210 g |

The mixture was blended in a kneader for 10 minutes. To the resultant blend, 700g of the comminuted pieces of the resin-glass fiber mixture were added, and the resulting mixture was milled on a two roll mill for 20 minutes at a temperature of 80° C, cooled and comminuted to provide a molding material (Material I).

For comparative purposes, a mixture of the following ingredients was prepared.

| | |
| --- | --- |
| Prepolymer of diallyl isophthalate, "DAP100L" | 260 g |
| Prepolymer of diallyl phthalate, "DAPK" | 140 g |
| CaCO$_3$, "Whiton SB Red" | 210 g |
| Dicumyl peroxide | 10 g |
| t-butylperoxy 2-ethylhexanoate | 1.0 g |
| Carbon black, "Seast SO" | 10 g |
| Sb$_2$O$_3$ (reagent grade) | 20 g |
| Diallyl chlorendate (reagent grade) | 40 g |

The mixture was blended in a kneader for 20 minutes, and the resulting mixture was milled on a two roll mill together with 300g of chopped strands of glass fiber, "CS6E401" (6 mm in length), for 30 minutes, at a temperature of 80° C, cooled and comminuted to provide a molding material (Material II). Materials I and II had the same composition.

Specimens for testing the bending strength were formed from both Material I and II at temperatures indicated in Table V below. On each specimen the warpage was observed and the bending strength was determined. The results are also shown in Table V below.

Table V

| Formed a temp. of | Material I | | Material II | |
| --- | --- | --- | --- | --- |
| | Bending strength kg/cm$^2$ | Warpage | Bending strength kg/cm$^2$ | Warpage |
| 150° C | 12.1 | none | 10.2 | none |
| 160° C | 13.2 | none | 12.1 | slight |
| 170° C | 14.6 | none | 12.0 | considerable |
| 180° C | 14.3 | slight | 8.5 | much |

EXAMPLE 5

A prepolymer of diallyl isophthalate, "DAP100L," (800g) was melted in a pressure kneader at a temperature of 90° C. To the molten resin 800g of a prepolymer of diallyl phthalate, "DAPK" was slowly added while stirring and the mixture was kneaded for 2 hours at the same temperature. Chopped strands of glass fiber, "CS6E401" (1500g, 6 mm in length) was then added and the kneading was continued for further 1 hour. The kneaded mixture was passed through a two roll mill while being soft, cooled and then comminuted to pieces.

Separately, the following ingredients were mixed.

| | |
| --- | --- |
| Dicumyl peroxide | 10 g |
| t-butylperoxy 2-ethylhexanoate | 1.0 g |
| CaCO$_3$ "Whiton 450" | 110 g |
| CaCO$_3$ "Whiton R06" | 100 g |
| Clay "Burgess KE" | 80 g |
| Carbon black "Seast SO" | 10 g |
| Sb$_2$O$_3$ | 20 g |
| Diallyl chlorendate | 40 g |
| Calcium stearate | 10 g |

The mixture was blended in a kneader for 10 minutes. To the resultant blend, 620g of the comminuted pieces of the resin-glass fiber mixture were added, and the resulting mixture was milled on a two roll mill for 30 minutes at a temperature of 85° C, cooled and comminuted to provide a molding material.

The molding material so prepared (about 1 kg) was placed in a polyethylene bag and kept in a thermostat maintained at a temperature of 35° C for a week. At the end of the period the material exhibited no blocking tendency. It was moldable at low pressures ranging 10 to 100 kg/cm$^2$. A specimen made from it for testing the blending strength showed no warpage and the blending strength of 15.6 kg/cm$^2$. Further, moldings made from it using the mold described in Example 2 were free from flashes longer than 3 mm.

What is claimed is:

1. A process for the production of anti-blocking and low pressure moldable diallyl phthalate resin molding materials, wherein a mixture of 100 parts by weight of at least one diallyl phthalate resin prepolymer 50 to 150 parts by weight of glass fiber, 30 to 200 parts by weight of at least one finely divided inorganic filler, 0.1 to 1.0 part by weight of t-butylperoxy 2-ethylhexanoate and 1.5 to 4.0 parts by weight of at least one organic peroxide having a half life of 1 hour at a temperature within the range of from 120° to 150° C, is milled at a temperature of 40° to 100° C.

2. A process in accordance with claim 1 wherein said organic peroxide is selected from the group consisting of t-butylperoxy laurate, t-butylperoxy benzoate, dicumyl peroxide and cyclohexanone peroxide.

3. A process in accordance with claim 1 wherein said finely divided inorganic filler comprises (i) 6 to 30% by weight, based on the total weight of the mixture of finely divided particles of an inorganic material selected from the group consisting of calcium carbonate, silica, diatomaceous earth, kaolin and talc, said particles having an average particle size in the range 1 to 50 $\mu$m, provided that at least 30% by weight of the particles have an actual particle size in the range 20 to 100 $\mu$m, in combination with (ii) 8 to 30% by weight, based on the total weight of the mixture, of finely divided particles of an inorganic material capable of imparting a dilatant property to the prepolymer when molten, said last-mentioned particles having an average particle size of less than 1 $\mu$m.

4. A process in accordance with claim 3 wherein said last-mentioned particles are present in the mixture in an amount of 8 to 20% by weight based on the total weight of the mixture.

5. A process in accordance with claim 1, wherein said finely divided inorganic filler comprises 10 to 50% by weight, based on the total weight of the mixture, of finely divided particles of calcium carbonate, said particles having a particle size of not greater than 0.08 $\mu$m.

6. A process in accordance with claim 5 wherein said particles of calcium carbonate are present in the mixture in an amount of 20 to 45% by weight based on the total weight of the mixture.

* * * * *

UNITED STATES PATENT OFFICE
CERTIFICATE OF CORRECTION

Patent No. 4,041,009  Dated August 9, 1977

Inventor(s) Shiroh Takeda et al

It is certified that error appears in the above-identified patent and that said Letters Patent are hereby corrected as shown below:

Column 1, line 66, delete "1"
Column 2, line 3 change "a" to --at--
Column 3, line 19, after "weight" insert --of--
Column 3, line 51, after "out" insert --at--
Column 4, last line, change "worsest" to --worst--
Column 6, line 12, change "μmintervals" to --μm intervals--
Column 6, line 8 of "EXAMPLE 3", after "on" insert --a--
Column 8, lines 49, "blending" each occurrence should read
-- bending --.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*